United States Patent [19]

Ikedo

[11] 4,200,295
[45] Apr. 29, 1980

[54] CONTROL MECHANISM FOR LIFTING, LOWERING AND SWINGING RECORD PLAYER TONEARM

[75] Inventor: Yuji Ikedo, Tokorozawa, Japan

[73] Assignee: Pioneer Electronic Corporation, Tokyo, Japan

[21] Appl. No.: 886,376

[22] Filed: Mar. 14, 1978

[30] Foreign Application Priority Data

Mar. 14, 1977 [JP] Japan .................. 52-26952

[51] Int. Cl.² ............................................ G11B 17/06
[52] U.S. Cl. ................................................ 274/15 R
[58] Field of Search ................ 74/28; 274/13, 15, 14, 274/23 R

[56] References Cited

U.S. PATENT DOCUMENTS 4,049,279  9/1977  Kleis ................................ 274/15 R

*Primary Examiner*—Harry N. Haroian
*Attorney, Agent, or Firm*—Sughrue, Rothwell, Mion, Zinn and Macpeak

[57] ABSTRACT

A record player tonearm A may be swung about a shaft 3 and raised and lowered by an elevation plate 8 secured to a shaft 8a. The rounded lower end of shaft 8a serves as a follower on a cam 10 rotated about a shaft 9 by a planetary gear 13 mounted on a shaft 10b eccentrically disposed on the cam with respect to the shaft 9. The planetary gear is frictionally engaged with the cam 10 whereby it initially revolves about shaft 9 to thereby rotate the cam and raise or lower the tonearm. After approximately one-half of a revolution the planetary gear comes to frictionally abut against a sector plate 18 secured to the bottom of shaft 3. This terminates the revolution, whereafter the planetary gear rotates about its shaft 10b to drive the sector plate and swing the tonearm.

7 Claims, 8 Drawing Figures

FIG. 3
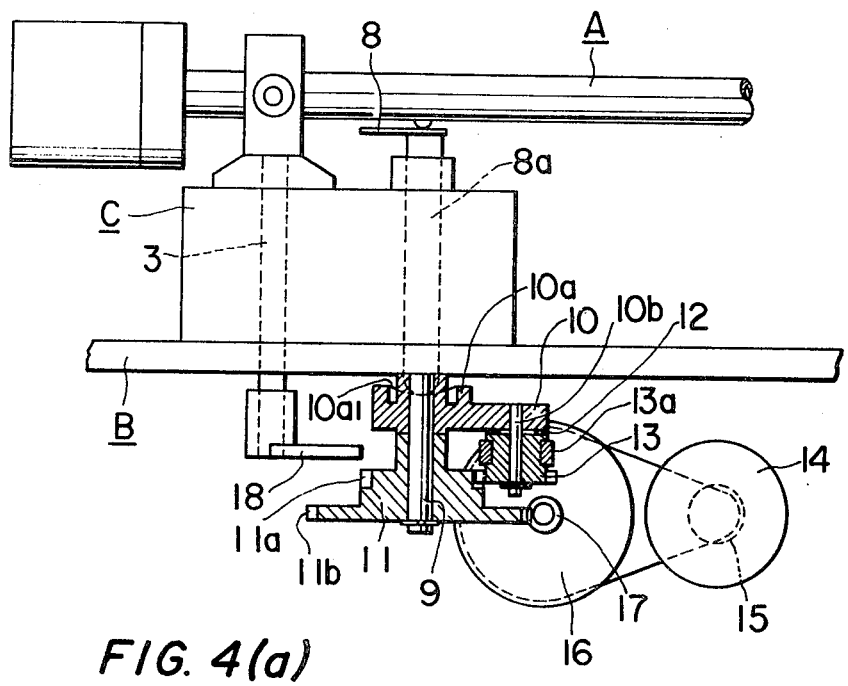
FIG. 4(a)
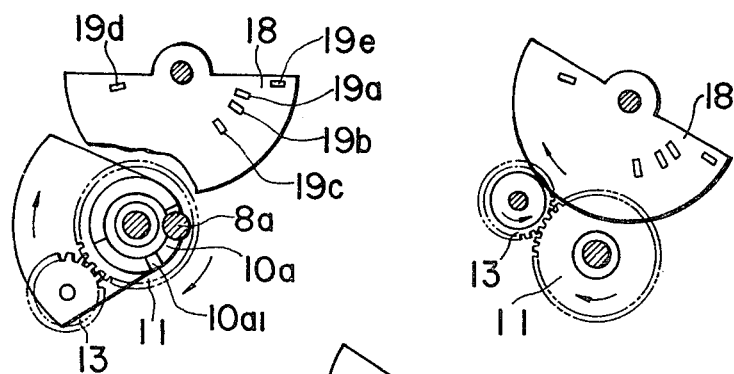
FIG. 4(b)
FIG. 4(c)
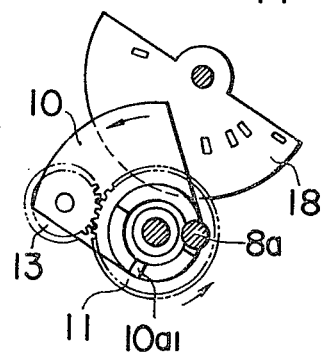

CONTROL MECHANISM FOR LIFTING, LOWERING AND SWINGING RECORD PLAYER TONEARM

BACKGROUND OF THE INVENTION

This invention relates to a control mechanism operable to lift, swing and lower the tonearm of a record player.

In a conventional tonearm control mechanism, the lowering of a phonographic pick-up cartridge onto a record disc is controlled by a selection lever which defines the rotation angle of the tonearm and functions as a stop means to halt the tonearm movement. This type of control mechanism, however, requires an electrical-mechanical converting means for detecting the rotational position of the selection lever. Further, the mechanism is disadvantageous in that it is extremely complicated in construction and the play or lost motion between the mechanical parts is excessive. In another type of conventional control mechanism, the lifting, swinging and lowering movements of the tonearm are separately effected by two motors. This mechanism, however, is disadvantageous in terms of cost.

PRINCIPLE OF THE INVENTION

The present invention embodies a new type of control mechanism, the principle construction of which is illustrated in FIG. 1.

In the drawing, a cam rack 2 having a sloping or ramp like cam surface 2a is adapted to be reciprocatingly moved in a lateral direction by a pinion gear 1. Drive plates 6 and 7 are provided near both edges of the cam 2, and are adapted to engage a pin 5 mounted on the end of a lever 4 to thereby rotate a tonearm shaft 3. A recessed portion or notch $2a_1$ is formed in the approximative center of the cam surface 2a to implement the raising and lowering of a vertically movable cam follower shaft 8a carrying a tonearm elevation plate 8 during the lateral movement of the cam rack 2.

The above construction is extremely simple, and effects both the raising and lowering movement of the tonearm and the swinging movement thereof. However, owing to the fact that all movements are effected only by the cam rack 2, the time required to lift and/or lower the tonearm is as long as that to swing it. Accordingly, such time delay constitutes a defect in the above construction, and a security mechanism is also needed when the tonearm is manually operated.

SUMMARY OF THE INVENTION

On the basis of the foregoing principle, the present invention eliminates the wasted time in the course of lifting and/or lowering the tonearm and provides a security mechanism in case of manually stopping the tonearm. Furthermore, the present invention provides a simplified control mechanism operable to lift, swing and lower the tonearm wherein the series of tonearm operations are effected by a single motor.

BRIEF DESCRIPTION OF THE DRAWINGS

In the drawings:

FIG. 3 shows a vertical cross section of the first embodiment;

FIGS. 4(a) to 4(c) are explanatory diagrams illustrating the operational sequences according to this invention;

DESCRIPTION OF THE PREFERRED EMBODIMENTS

Figure 1:
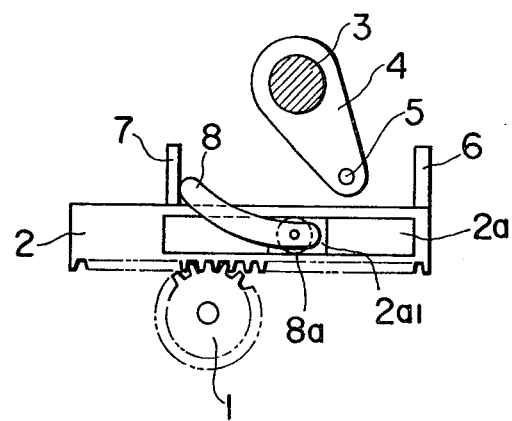
FIG. 1 shows an explanatory diagram illustrating the basic principle of this invention.
Figure 2:
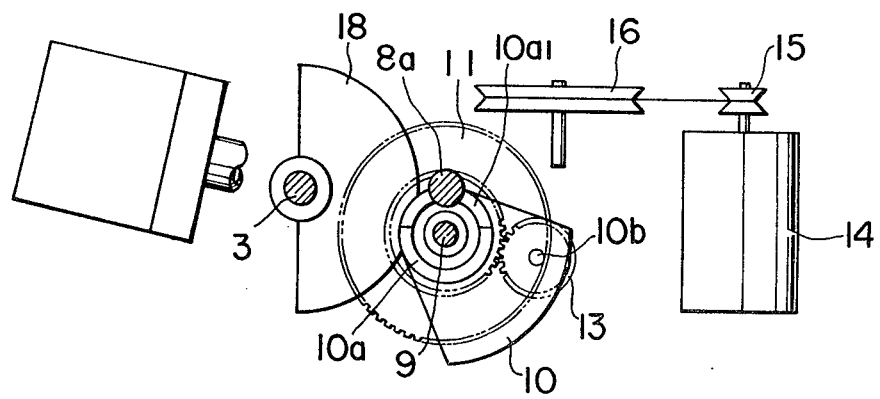
FIG. 2 shows a plan view according to a first embodiment of this invention.

One of the preferred embodiments according to the present invention will now be described with reference to FIGS. 2 to 4.

Reference symbol A designates a tonearm adapted to rotate about a shaft 3, B designates a mounting panel of the record player, and C designates bearing means for the tonearm shaft 3 and the lifting and lowering shaft 8a having an elevation plate 8 mounted on the top thereof. A main shaft 9 is fixed in a position slightly displaced from the shaft 8a, and a cam 10 and a drive gear 11 are independently rotatably mounted on the shaft 9. At the approximate midpoint of the sloping or chamfered semicircular upper surface portion 10a of the cam 10, there is provided a recessed notch or cutout portion $10a_1$. On the eccentrically positioned shaft 10b a planetary gear 13 is mounted, and a friction plate 12 is interposed between the cam 10 and the planetary gear 13. A roller portion 13a made of rubber etc. is formed in the periphery of the planetary gear 13. The drive gear 11 has a toothed portion 11a adapted to engage the planetary gear 13, and a toothed portion 11b engaged with a worm 17 rotated by a motor 14 via belt pulleys 15 and 16.

Reference numeral 18 designates a semicircular swing plate fixedly secured to the tonearm shaft 3. The plate 18 is located on the same horizontal plane as the roller portion 13a, and its outer periphery is adapted to abut the roller portion when the planetary gear 13 is revolved about the main shaft 9 by the rotation of cam 10. In other words, the plate 18 is arranged to include the revolution locus of the planetary gear 13. Further, the plate 18 includes apertures 19c to 19c for stopping the tonearm at the position of the outermost groove of the record disc in correspondence with the size of the disc, an aperture 19d for detecting the position of the arm rest, and an aperture 19e for detecting the terminated position of the record reproduction. These apertures are sensed by a known light emitting and light receiving element, and in response to the detected signals the rotation of the motor 14 is controlled. Magnetic or electroacoustic aperture detection is also possible.

The operation of the control mechanism will be described in conjunction with FIGS. 4(a) to 4(c). According to the rotation of the motor 14, the worm 17 is rotated so that the drive gear 11 is rotated. Accordingly, the planetary gear 13 is rotated about shaft 9 at the same speed as the drive gear 11 and the cam 10, since the planetary gear 13 is engaged with the toothed portion 11a. At this time the planetary gear 13 per se does not rotate because a frictional force due to the friction plate 12 is applied thereto, but only revolves about the main shaft 9 as seen in FIG. 4a. That is, the planetary gear 13 only revolves about shaft 9 because the frictional force between the planetary gear 13 and the cam 10 is greater than the frictional force of the cam 10 against the main shaft 9 and/or the follower shaft 8a.

Under the control of the motor 14, the lowering of the tonearm onto the record disc or onto the arm rest in the rest position is implemented by positioning notch portion $10a_1$ beneath the shaft 8a. In this position the drive plate 18 is located on the opposite side of the main shaft 9 from the planetary gear 13. Accordingly, the tonearm is freely movable. As shown in FIG. 4(a), as the cam 10 rotates about the main shaft 9, the shaft 8a being in the notch portion $10a_1$ is raised, as a result of which the tonearm is raised from the arm rest. At this time the force of the friction plate 12 cancels the resistance between the shaft 8a and the cam surface 10a, and thus the raising movement of the tonearm A is smoothly effected without any trouble. The cam 10 continues its rotation. When the roller portion 13a of the planetary gear 13 abuts the swing plate 18, the revolution of the planetary gear and the rotation of the cam 10 are stopped, but the drive gear 11 still continues its rotation due to the motor 14. As a result, the frictional force of friction plate 12 is overcome, and the planetary gear 13 begins to rotate about the shaft 10b.

Accordingly, the rotation of the planetary gear 13 also moves the outer periphery of the swing plate 18 which is now in frictional contact with the roller portion 13a. Thus, the swing plate 18 begins to rotate about the arm shaft 3, and thus the tonearm is moved in the direction of the record disc. Since the roller portion 13a is rotated under a constant frictional biasing against the swing plate 18, the swinging motion of the tonearm is stabilized and smoothly effected.

When the tonearm A is rotated to a certain angle, that is, when either of the apertures 19a to 19c is detected, the motor 14 is rotated in reverse. This causes the drive gear 11, the planetary gear 13 and the cam 10 to also reversely rotate in the opposite manner of the foregoing description. (See FIG. 4c) At this time, due to the release of the roller portion 13a from the swing plate 18, the planetary gear 13 ceases to rotate per se and again begins its revolution about the main shaft 9 because of the force of the friction plate 12.

Since the cam 10 was stopped when the swing plate 18 initiated its rotation, the reverse rotation of the cam 10 returns the notch portion $10a_1$ to the position beneath the shaft 8a after a small amount of reverse rotation of the motor 14, because the notch portion $10a_1$ is not far removed from the shaft 8a. Thus, the shaft 8a is lowered to thereby lower the pick-up cartridge into the groove of the record disc. The motor 14 stops at the position shown in FIG. 2, to thereby complete the lead-in operation of the tonearm.

In the above operation, if the motor 14 is forwardly rotated for a period of time $T_1$ during which the planetary gear 13 revolves into abutment with the swing plate 18, the tonearm is raised. During subsequent or continuing forward rotation for a period of time $T_2$, the tonearm is rotated by a predetermined angle. If the motor 14 is then reversely rotated for the period of time $T_1$, the tonearm is lowered onto the record disc. Thus, the time needed for raising and lowering the tonearm is constant regardless of the size of record disc and independent of the rotation time $T_2$. Therefore, it is easily possible to design the mechanism so that the above time periods have a relationship of $T_1 < T_2$.

The return of the tonearm from the playing position to the original position (i.e., the arm rest) is initiated at the termination of the record reproduction by the detection of the aperture 19e on the driven plate 18. The detection of this aperture causes the motor 14 to rotate the driven gear 11 in a counter-clockwise direction to thereby revolve the planetary gear 13 about the shaft 9 in a counter-clockwise direction. As a result, the tonearm is raised as the follower shaft 8a rides up on one half of the sloping cam surface 10a. The tonearm initiates its reverse rotation about shaft 3 when the roller portion 13a abuts the swing plate 18. When the aperture 19d on the swing plate corresponding to the rest position of the tonearm is detected, the motor 14 is reversely rotated whereby the planetary gear 13 is released from the swing plate 18 and revolved back in a clockwise direction about shaft 9. As the rounded bottom end of the follower shaft 8a rides down the same half of the sloping cam surface 10a into the notched recess $10a_1$, the tonearm is lowered onto the arm rest to complete the return operation.

The coupling between planetary gear 13 and driven gear 11 may be effected by frictional engagement, whereby the gear teeth become unnecessary. Further, a spring may be employed in lieu of the friction plate 12.

Safeguarding against damage to the mechanism when the tonearm is manually manipulated during its automatic movement is implemented by frictional slippage between the cam 10 and the planetary gear 13 via the friction plate 12, or between the swing plate 18 and the roller portion 13a if the cam 10 has already been rotated against the swing plate.

Figure 5:
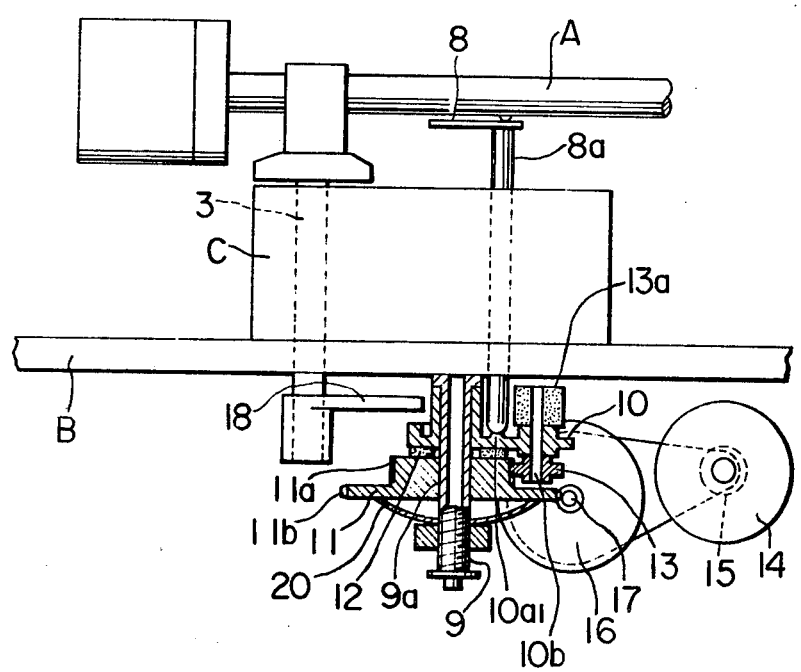
FIG. 5 shows a vertical cross section according to a second embodiment of this invention.
Figure 6:
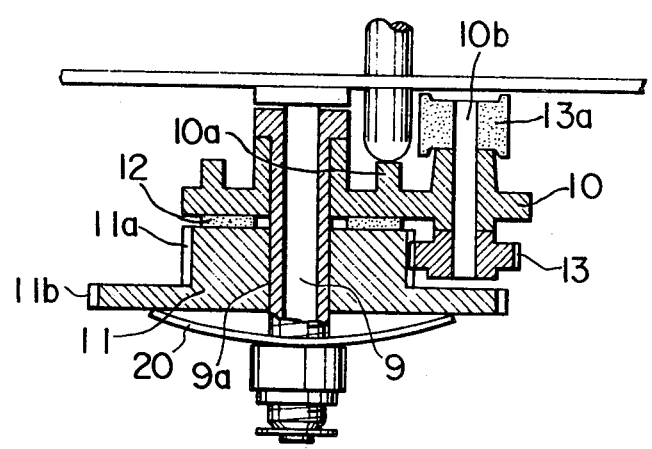
FIG. 6 shows an enlarged vertical section of a portion of FIG. 5.

Another embodiment is shown in FIGS. 5 and 6, in which the same reference symbols and numerals designate the same parts already shown and described in connection with FIGS. 2–4. The operation of this embodiment is substantially the same as that of the first embodiment. This embodiment is modified by fixedly securing an upper flanged sleeve 9a to the outer periphery of the main shaft 9, and by providing a compression spring 20 at the bottom of shaft 9. The sleeve 9a coaxially supports the cam 10 and the drive gear 11 with the friction plate 12 interposed therebetween, and these members are biased together by the spring 20. Due to the provision of the spring 20, the frictional force between the drive gear 11 and the cam 10 can be made stronger than the frictional force of cam 10 applied to the shaft 8a so that the planetary gear 13 may be revolved about the main shaft 9 as described above. In this embodiment the swing plate 18 is installed upside down with respect to the first embodiment, and the frictional roller member 13a is mounted on top of the cam 10 rather than beneath it.

What is claimed is:

1. In a control mechanism for lifting, lowering and swinging the tonearm of a record player wherein the tonearm is adapted to rotate with a first shaft and to be lifted and lowered by an elevation plate mounted at the top of a second shaft, the improvement comprising:

(a) cam means rotatably mounted on a third shaft for lifting and lowering the second shaft in accordance with the rotation of the cam means;

(b) planetary gear means rotatably mounted on a fourth shaft;

(c) means mounting the fourth shaft eccentrically and directly on the cam means with respect to the third shaft whereby the planetary gear means may rotate about the fourth shaft and revolve about the third shaft, said mounting means comprising means for frictionally engaging said planetary gear means with said cam means, the force of frictional engagement being greater than that between said cam means and said second shaft;

(d) driven plate means mounted on the first shaft for swinging the tonearm and positioned in a plane including the revolution locus of said planetary gear means; and (e) means for driving said planetary gear means, whereby revolution of said planetary gear means about the third shaft rotates the cam means to lift and lower the tonearm until said planetary gear means is drivingly engaged with the driven plate means whereupon rotation of the planetary gear means about the fourth shaft rotates the tonearm.

2. A control mechanism as claimed in claim 1 wherein said driving means comprises a driven gear rotatably mounted on the third shaft and engaged with said planetary gear means.

3. A control mechanism as claimed in claim 2 wherein said planetary gear means frictionally engages said driven gear.

4. A control mechanism as claimed in claim 1 wherein said frictional engagement is implemented by a friction plate or a spring disposed between said planetary gear means and said cam means.

5. A control mechanism as claimed in claim 1 wherein said planetary gear means includes a roller portion adapted to frictionally engage said driven plate means.

6. A control mechanism as claimed in claim 1 wherein said drive means is rotatable forwardly and reversely.

7. A control mechanism as claimed in claim 1 wherein said drive means comprises a drive gear rotatably mounted on said third shaft.

* * * * *